April 19, 1955 M. E. KROM 2,706,749

TESTING SMALL PRIVATE BRANCH EXCHANGE TRUNK GROUPS

Filed Aug. 28, 1952 8 Sheets-Sheet 1

INVENTOR
M. E. KROM
BY C. Mathie
ATTORNEY

TESTING SMALL PRIVATE BRANCH EXCHANGE TRUNK GROUPS

Filed Aug. 28, 1952 8 Sheets-Sheet 2

INVENTOR
M. E. KROM
BY C. Mattie
ATTORNEY

TESTING SMALL PRIVATE BRANCH EXCHANGE TRUNK GROUPS

Filed Aug. 28, 1952 8 Sheets-Sheet 3

INVENTOR
M. E. KROM
BY C. Mattice
ATTORNEY.

TESTING SMALL PRIVATE BRANCH EXCHANGE TRUNK GROUPS

Filed Aug. 28, 1952 8 Sheets-Sheet 4

INVENTOR
M. E. KROM
BY C. Mattice
ATTORNEY

April 19, 1955 M. E. KROM 2,706,749

TESTING SMALL PRIVATE BRANCH EXCHANGE TRUNK GROUPS

Filed Aug. 28, 1952 8 Sheets-Sheet 5

INVENTOR
M. E. KROM
BY C. Mathie
ATTORNEY.

INVENTOR
M. E. KROM
BY C. Mattice
ATTORNEY

April 19, 1955 M. E. KROM 2,706,749

TESTING SMALL PRIVATE BRANCH EXCHANGE TRUNK GROUPS

Filed Aug. 28, 1952 8 Sheets-Sheet 7

INVENTOR
M. E. KROM
BY C. Mattice
ATTORNEY

April 19, 1955 M. E. KROM 2,706,749

TESTING SMALL PRIVATE BRANCH EXCHANGE TRUNK GROUPS

Filed Aug. 28, 1952 8 Sheets-Sheet 8

INVENTOR
M. E. KROM
BY C. Mattice
ATTORNEY

United States Patent Office 2,706,749

Patented Apr. 19, 1955

2,706,749

TESTING SMALL PRIVATE BRANCH EXCHANGE TRUNK GROUPS

Myron E. Krom, Convent Station, N. J., assignor to Bell Telephone Laboratories, Incorporated, New York, N. Y., a corporation of New York Application August 28, 1952, Serial No. 306,890

3 Claims. (Cl. 179—18)

This invention relates to telephone systems and has for its object to facilitate the establishment of telephone connections.

In telephone systems employing cross bar switches under the control of markers the location of a subscriber's line in the switches is independent of the telephone designation and establishing a connection under the control of the registered telephone designation is made possible by the use of a translating device commonly called a number group circuit which translates the numerical designation into an indication of the location of the line on a particular frame and switch. When more than one line is assigned to a designation, as in the case of private branch exchanges, the number group circuit is equipped to recognize this fact, and auxiliary means is provided for testing the group of lines assigned to the designation before making a definite translation. However, certain circuit limitations have heretofore prevented the assignment of more than one number within a series of ten consecutive numbers as a P. B. X designation.

In accordance with the present invention, means is provided to permit the use of more than one number in a group of ten numbers as P. B. X designations.

More specifically, means is provided which is operated in accordance with the tens digit of a registered designation to identify a group of numbers including more than one P. B. X designation, together with means under the control of said identifying means and the units digit of the registered designation to control the testing of the associated group of lines.

These and other features of the invention will be more clearly understood from a consideration of the following description when read in connection with the attached drawing, in which:

Fig. 2 also showing in diagrammatic form the marker registers involved in the number translation;

Figure 7:
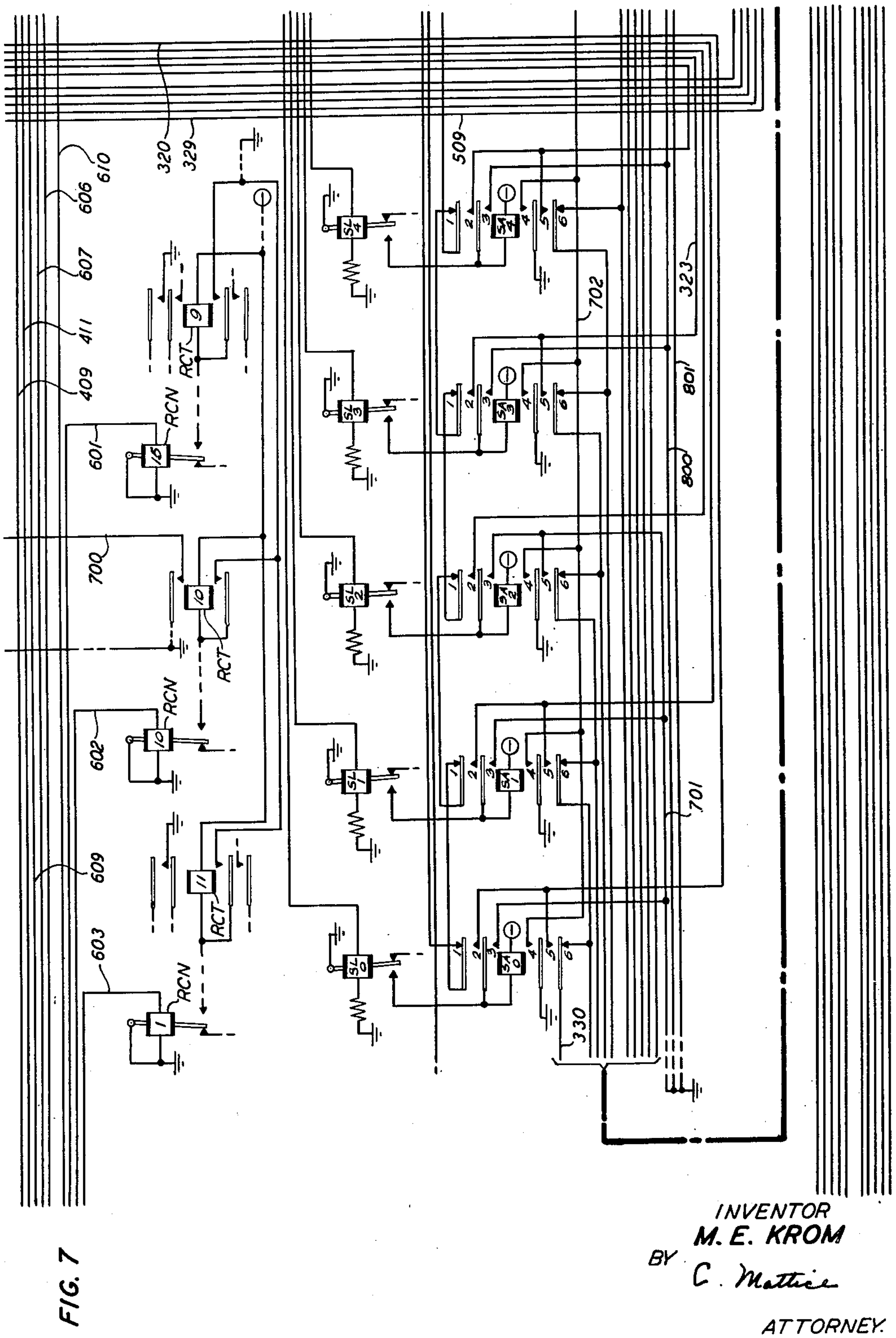
Figure 8:
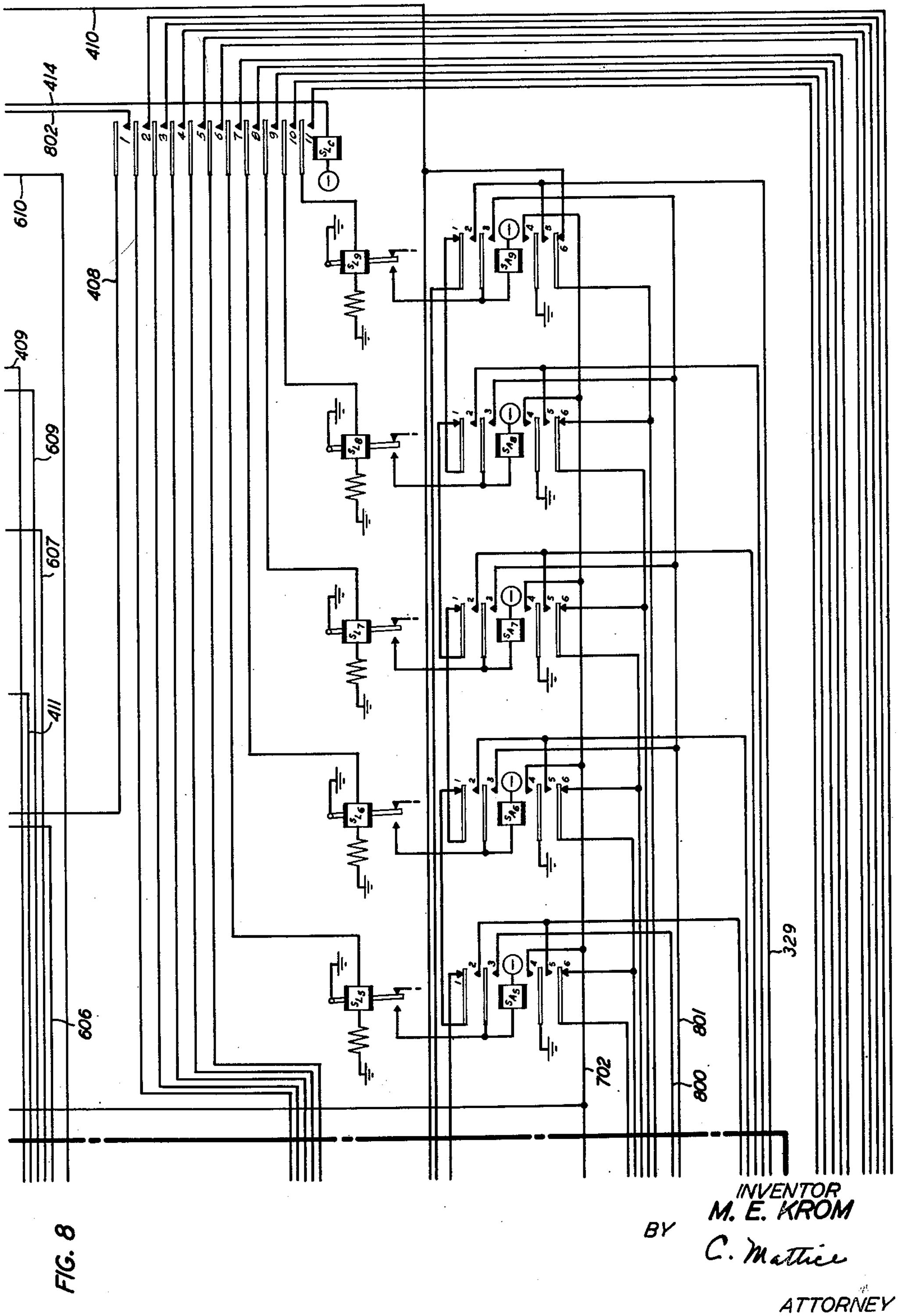

Figs. 7 and 8 show the P. B. X line testing relays; and

Figures 1, 9:
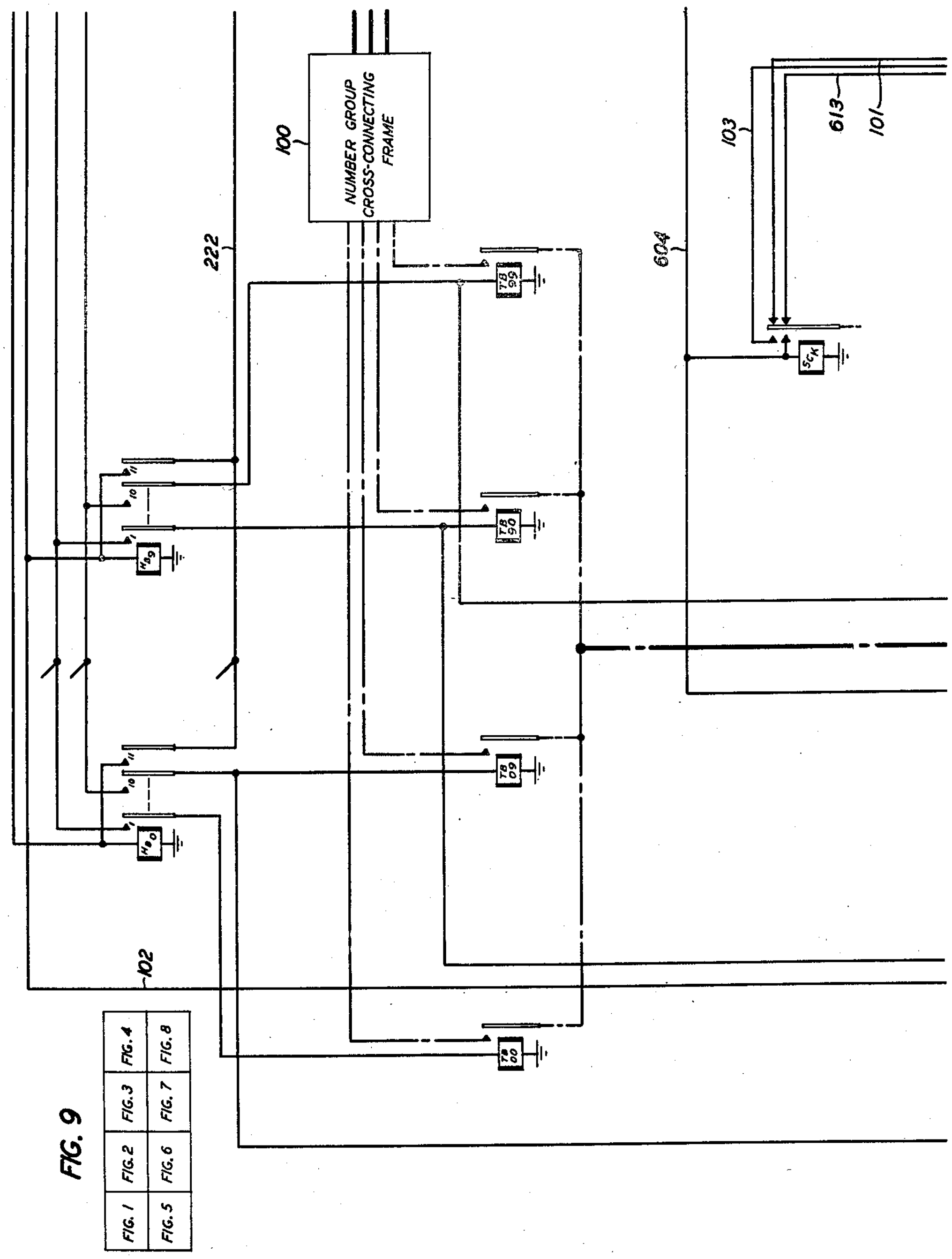
Figs. 1 and 5 show a number group circuit.
Figure 2:
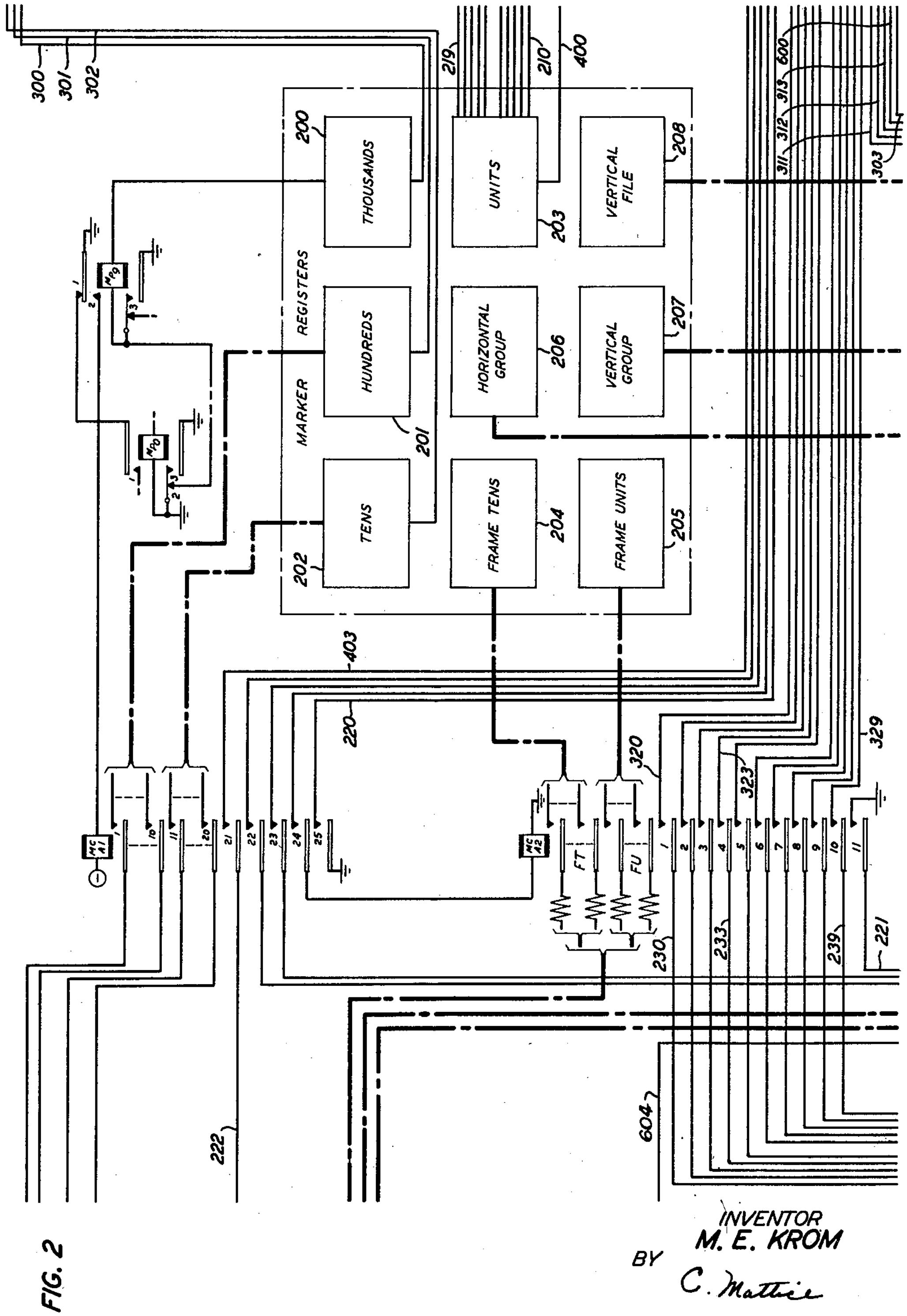
Figs. 2 and 6 show a number group connector.
Figure 3:
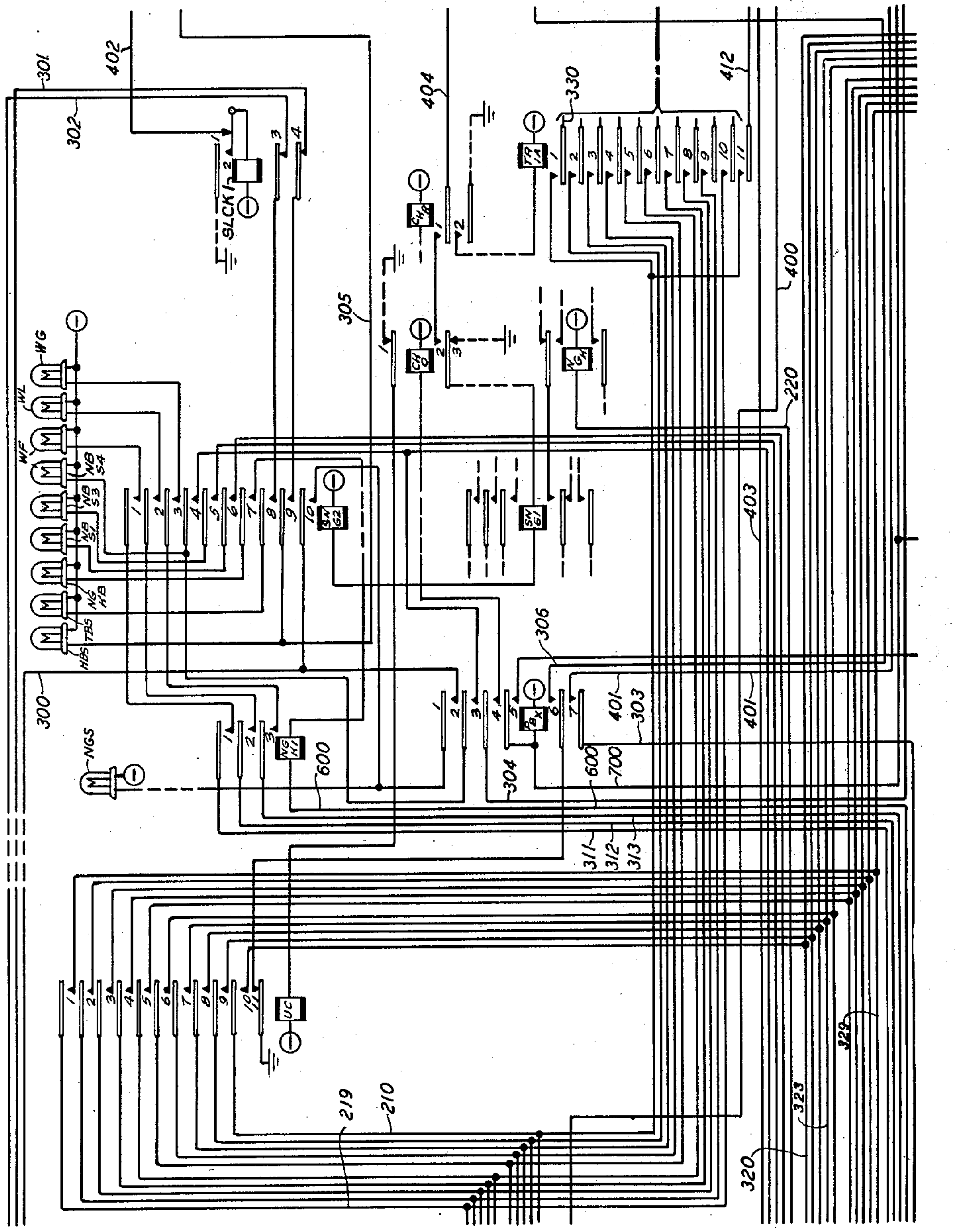
Figs. 3 and 4 show the translation and testing control circuits of the marker.
Figure 4:
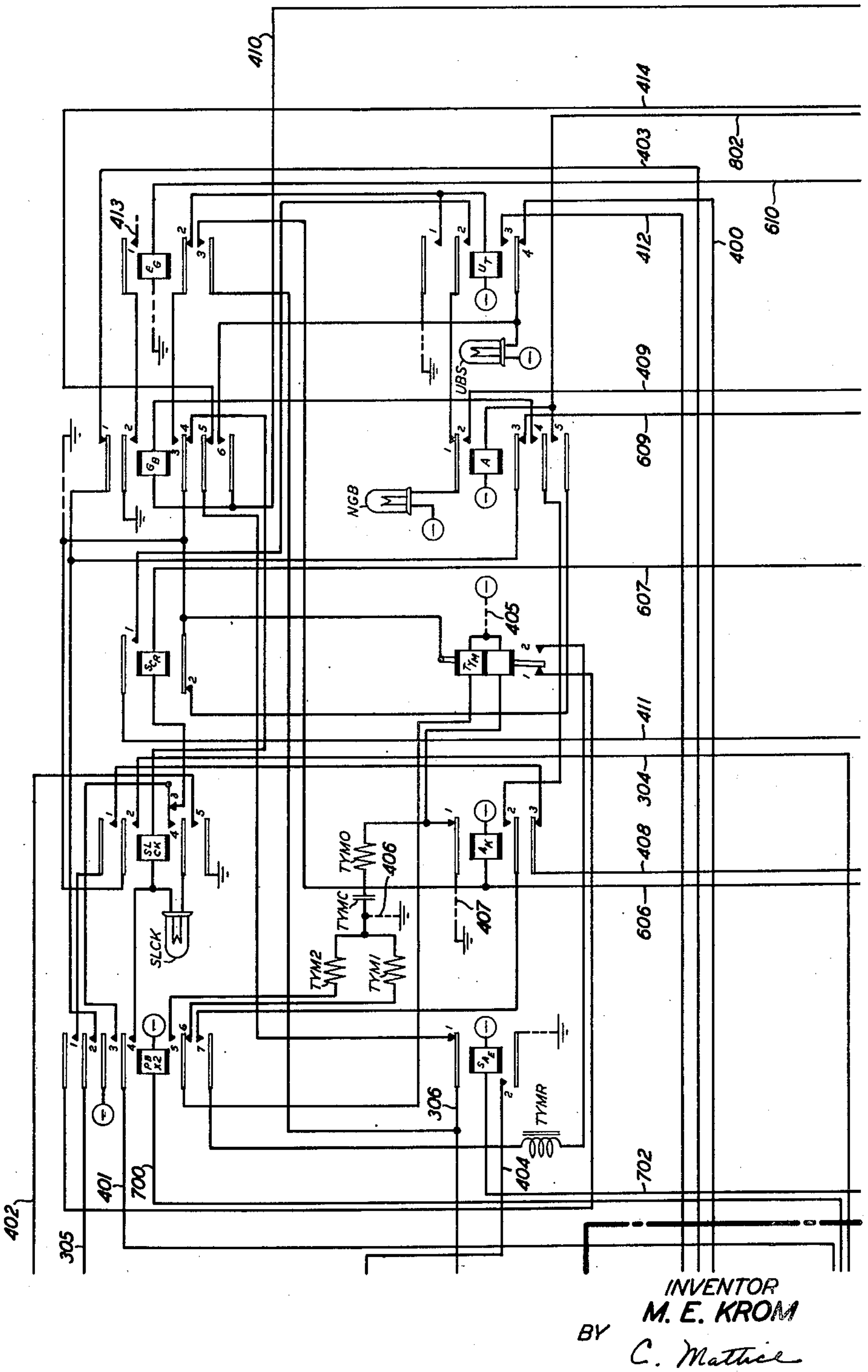
Figure 5:
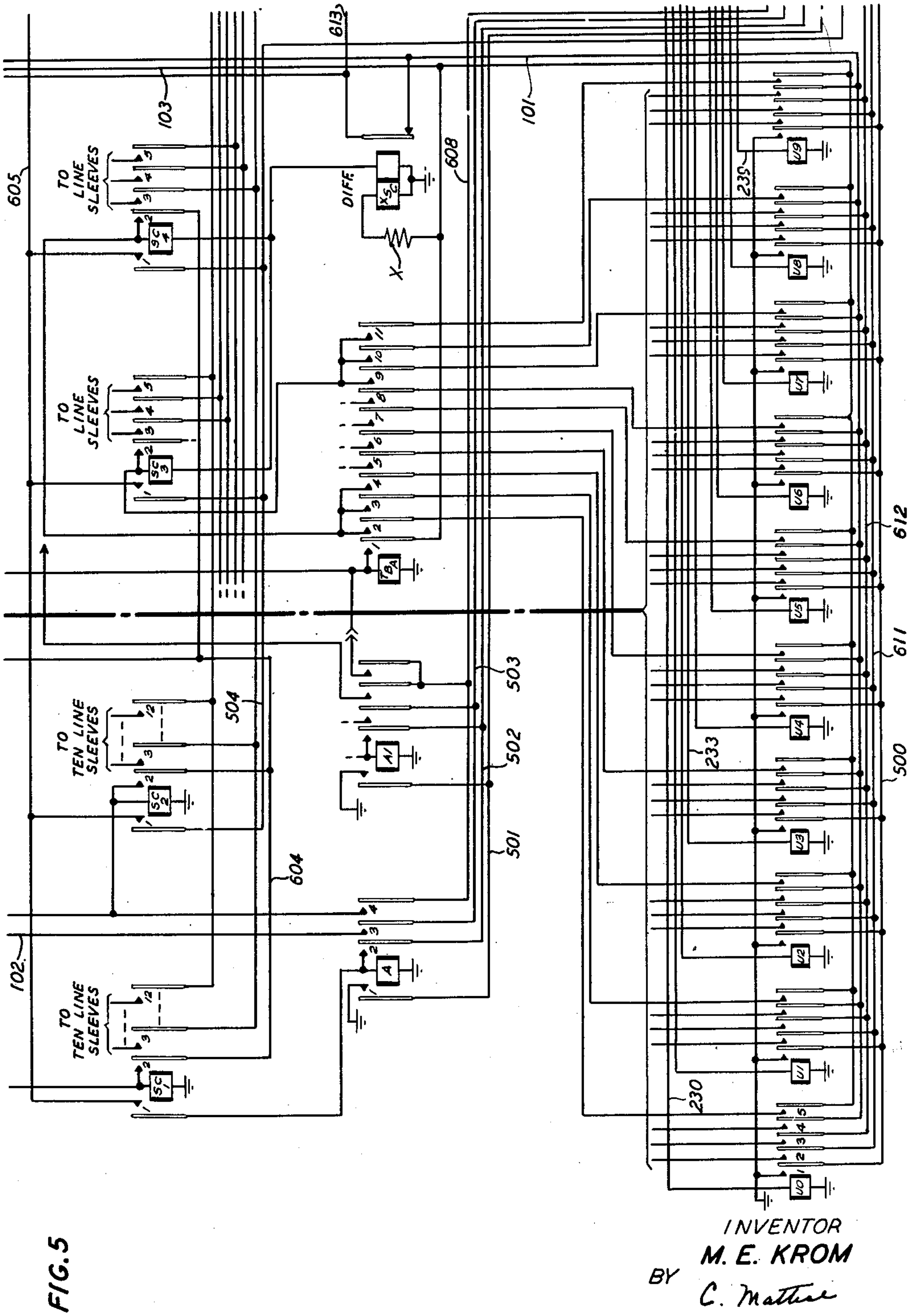
Figure 6:
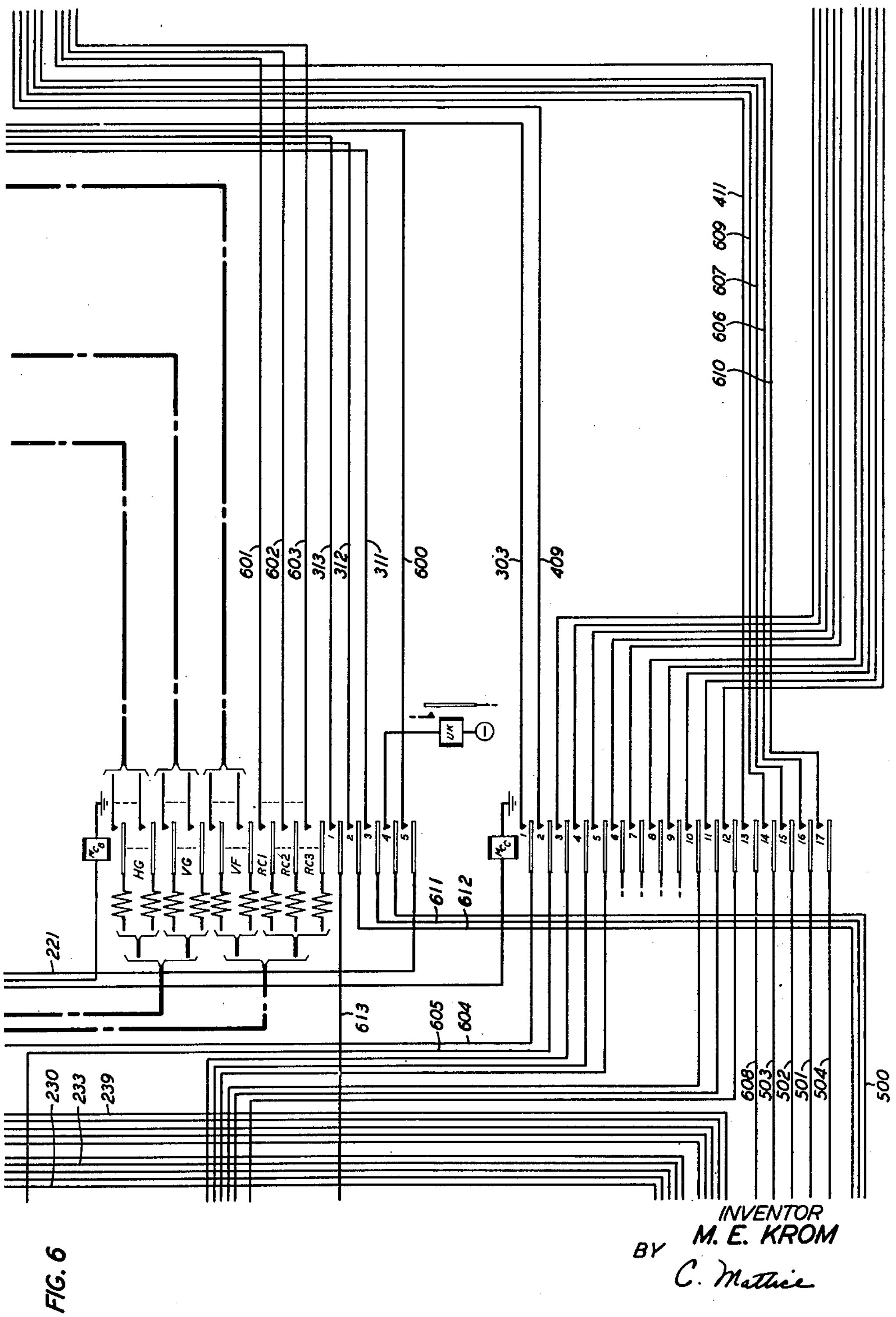

Fig. 9 shows the manner in which Figs. 1 to 8 should be arranged.

The present arrangement is designed to function with a cross bar telephone system of the type disclosed in Patent 2,585,904, granted February 19, 1952, to A. J. Busch to which reference is made for a description of the system as a whole.

As described in the above-identified Busch patent, when a call is to be set up to a called line, the line designation is transferred to the marker and registered on the thousands, hundreds, tens and units registers 200, 201, 202 and 203. In addition, certain off-normal relays, terminating class-of-call relays and check relays are operated. In addition, since this is a terminating class call, the number group start relays SNG2(3) and SNG1(3) are operated over a back contact of relay CKO(3). Relay UC(3) is also operated over a back contact of relay CKO(3).

As set forth in the Busch patent, each number group circuit contains the information concerning a thousand line designations and is selected in accordance with the thousands digit registered. When the marker is ready to call in a number group circuit, the start circuit for the number group selected by the thousands digit register 200 is closed extending from battery through lamp NGS(3), contact 10 of relay SNG2(3), conductor 300, through the thousands register 200, winding of marker preference relay MP9(2), over normally closed contacts of intermediate marker preference relays to ground at contact 2 of relay MP0(2). Relay MP9(2) operates, locks to ground over its contact 3 and closes a circuit from ground over its contact 2 to battery, through the winding of multicontact relay MCA1(2). Relay MCA1(2) operates and closes circuits for operating multicontact relays MCA2(2), MCB(6) and MCC(6). These relays have their windings connected to ground and are supplied with battery over contacts 4, 5 and 6 of relay SNG2(3) and through lamps NBS1(3), NBS3(3) and NBS4(3). With relays MCA1(2), MCA2(2), MCB(6) and MCC(6) operated, the number group circuit is ready to receive the rest of the designation from the marker. A circuit is closed from battery through lamp HBS(3), contact 9 of relay SNG2(3), contact 4 of relay SLCK1(3), conductor 301, through the hundreds register 201 to one of the contacts 1 to 10 of relay MCA1(2) and the winding of one of the hundred block relays HB0(1) to HB9(1). For convenience, it will be assumed that relay HB0(1) is operated. Under the control of the tens register 202, a circuit is closed from battery through lamp TBS(3), contact 8 of relay SNG2(3), contact 3 of relay SLCK1(3), conductor 302, through the tens register 202 to one of the contacts 11 to 20 of relay MCA1(2), over one of the contacts 1 to 10 of relay HB0(1) to the winding of one of the tens block relays TBO0(1) to TBO9(1). For convenience, it will be assumed that relay TBO0(1) is operated. The units register 203 connects battery to one of ten conductors leading to the number group circuit to operate one of the units relays U0(5) to U9(5). This circuit may be traced from battery through lamp UBS(4), over contact 4 of relay UT(4), conductor 400, through the units register 203, one of the conductors 210 to 219, one of the contacts 1 to 10 of relay UC(3), one of the conductors 320 to 329, one of the contacts 1 to 10 of relay MCA2(2), conductors 230 to 239 to ground through the winding of one of the relays U0(5) to U9(5). It may be assumed that relay U0(5) is operated.

Relay MCA1(2) in operating connects ground over its contact 25, conductor 220 to battery, through the winding of relay NGK(3) to indicate that the number group connector has operated. Relays MCA(2) and MCB(6) also close a checking circuit which may be traced from ground over contact 11 of relay MCA(2), conductor 221, contact 5 of relay MCB(6), conductor 600, winding of relay NGK1(3), contact 7 of relay SNG2(3) to battery, through lamp NGKB(3). The units relay U0(5) also closes a checking circuit from ground over its contact 1, conductor 500, contact 4 of relay MCB(6) to battery, through the winding of relay UK(6) in the marker.

As described in the Busch patent, each number group circuit has one thousand sets of terminals indicated in the present application by the rectangle numbered 100. Each set of terminals corresponds to one of the thousand designations having the thousands digit to which the number group circuit is individual. With one unit relay and one tens block relay operated, one set of terminals is marked by having extended to them battery supplied by the marker. Corresponding to the three terminals which constitute each line designation set there are three sets or fields of translator terminals. These are used for transmitting to the markers the location of the called line and the kind of ringing current required. One field provides the identity of the line link frame on which the called line is located in terms of the tens and units digits of the frame number, the second field identifies the line group in terms of the horizontal group and the vertical group on the line link frame within which the called line is located, and the third field identifies the vertical file in which the line is located and the type of ringing current required by the line. Each translator field has as many terminals as there are combinations of the items in that field. Each translator terminal is connected in parallel through two resistances to one conductor in each of two sets, each set having one conductor for each item. These conductors are extended over contacts of the multicontact relays of the connector back to the marker. They are indicated in the present disclosure by the contacts FT of relay MCA2(2) leading to the frame tens register 204, the FU contacts of relay MCA2(2) leading to the frame units register 205, the HG contacts of relay MCB(6) leading to the horizontal group register 206, the VG contacts of relay MCB(6) leading to the vertical group register 207 and the VF contacts of relay MCB(6) leading to the vertical file register 208. The ringing control circuits are indicated extending over contacts RC1, RC2 and RC3 of relay MCB(6), conductors 601, 602 and 603 extending to relays RCN15(7), RCN10(7) and RCN1(7). Battery is supplied to these circuits through lamps WF(3), WL(3) and WG(3), over contacts 1, 2 and 3 of relay SNG2(3), contacts 1, 2 and 3 of relay NGK1(3), conductors 311, 312 and 313, contacts 1, 2 and 3 of relay MCB(6) to conductors 611, 612 and 613. Conductors 611 and 612 extend over contacts 2 and 3 of relay U0(5) and contacts of relay TBO0(1) to the number group cross-connecting frame 100. Conductor 613 extends either over the back contacts of relay SCK(1) or over the back contact of relay XSC(5) to conductor 101 and thence to contact 4 of relay U0(5) and a contact of relay TBO0(1) to the number group cross-connecting frame 100. It will be noted that these translating circuits are not closed until after checking relay NGK1(3) has operated. With the registration set up on the frame tens, frame units, horizontal group, vertical group and vertical file registers, the marker may proceed to seize the wanted line and release the number group circuit. The ringing control relay, for example, relay RCN1(7), determines the type of ringing current to be used in signaling the called line.

In case the registered designation is that of a private branch exchange having lines in more than one tens block, the registration of the designation and its transfer to the number group circuit take place as above described. For such a designation an auxiliary relay is connected in parallel with the tens block relay as shown in connection with relay TB09(1), the auxiliary relay being relay SC1(5). Therefore, relay SC1(5) operates at the same time that relay TB09(1) is operated. The set of terminals to which battery is connected by the joint operation of a units relay and relay TB09(1) is wired to connect battery to ringing control conductors 602 operating relay RCN10(7). Relay RCN10(7), in turn, operates relay RCT10(7) which connects ground to conductor 700 to operate relays PBX(3) and PBX2(4) to indicate that the designation registered is that of a PBX group. With relay SC1(5) in the number group circuit and relays PBX(3) and PBX2(4) in the marker operated, a circuit is closed from ground over contact 4 of relay GB(4), winding of relay SLCK(4), contact 4 of relay PBX2(4), conductor 401, contact 7 of relay PBX(3), conductor 303, contact 1 of relay MCC(6), conductor 604, contact 2 of relay SC1(5) to the operating circuit of relay SC1(5). The winding of relay SCK(1) is also connected to conductor 604 so that it also operates. Relay SLCK(4) operates, as an indication that the sleeve connector relay of the number group circuit has operated, and locks through resistance lamp SLCK(4), over its contact 4 to battery over contact 3 of relay PBX2(4), thereby providing a locking circuit for relay SC1(5) and the tens block relay TB09(1) in the number group circuit. With relay SLCK(4) operated, a circuit is closed from battery, through the winding of relay CK0(3), contact 4 of relay PBX(3), conductor 304, contact 2 of relay SLCK(4) to off-normal ground, operating relay CK0(3). Relay SLCK(4) also closes a circuit from ground over its contact 5, conductor 402, contact 1 and winding of relay SLCK1(3) to battery. Relay SLCK1(3) operates and locks over its contact 2 to off-normal ground, opening at its contacts 3 and 4 the operating circuits for the hundreds block relay and the tens block relay in the number group circuit. The operation of relay CK0(3) opens the circuit of relays SNG1(3) and SNG2(3) so that these relays release, disconnecting battery from the translation circuits. Relay SNG2(3) also opens the operating circuits for relays MCA2(2), MCB(6) and MCC(6) but relay MCC(6) is held operated by a circuit extending over contact 3 of relay PBX(3) to battery through lamp NBS4(3). Similarly a holding circuit is provided for the hundreds block relay from battery through lamp HBS(3), over conductor 305, contacts 2 of relay PBX2(4), contact 1 of relay GB(4), conductor 403, contact 21 of relay MCA1(2), conductor 222, over the outermost contact of the operated hundred block relay HB0(9) to ground through the relay winding.

As described in the Busch patent the operation of relay CK0(3) brings about the release of the registration set up in the line location registers 204, 205, 206, 207 and 208, since, if the line corresponding to the registered designation is busy, a different line location will have to be registered. When all of the line location registers have released, relay CKR(3) operates, in turn operating relay TR1A(3) and preparing a new operating circuit for the number group start relays SNG1(3) and SNG2(3).

When relay CK0(3) operates as above described, it opens the circuit of relay UC(3) causing that relay to release. Relay UC(3) in releasing, closes a circuit from ground over its contacts 11, contact 6 of relay PBX(3), conductor 306, contact 1 of relay SAE(4), contact 5 of relay GB(4), conductor 414 to battery through the winding of relay SLC(8). Relay SLC(8) prepares the circuits for testing for an idle line in the PBX group.

With relays SC1(5) and SCL(8) operated, the sleeve conductors of the group of ten PBX lines associated with relay SC1(5) are connected to the windings of the sleeve test relays SL0(7) to SL9(8) and thence to ground. The sleeve conductors of idle lines have battery connected thereto through the associated hold magnet windings, while the sleeve conductors of busy lines will have ground connected thereto over the connection with which they are occupied. Therefore, only those of the relays SL0(7) to SL9(8) which are connected to idle lines will operate.

Assuming that relays SL3(7), SL5(8) and SL7(8) to SL9(8) operate, each of these relays operates its auxiliary relay SA3(7), SA5(8), SA7(8) to SA9(8), the latter relays locking over conductors 800 and 801 to off-normal ground. Each of the auxiliary relays connects ground to conductor 702, operating relay SAE(4). With relay SAE(4) operated, ground is connected over contact 2 of relay SAE(4), conductor 404, contact 1 of relay CKR(3), contact 2 of relay CK0(3) to battery through the windings of relays SNG1(1) and SNG2(3) to reclose the translating circuits. When relays SNG1(3) and SNG2(3) reoperate, the circuits of relays MCA(2) and MCB(6) are again closed and these multicontact relays reoperate in turn reoperating relay NGK1(3).

The hundreds block relay HB0(1) and tens block relay TBO9(1) have been held operated as above described. With one or more of relays SA0(7) to SA9(7) operated, a circuit is closed for operating the units relay of the number group circuit corresponding to the first idle line. The circuit for this purpose may be traced from battery through resistance lamp UBS(4), contact 4 of relay UT(4), conductor 400, through the units register 203 to the conductor selected by the units registration, for example conductor 210, contact 1 of relay TR1A(3), conductor 330, contact 6 of relay SA0(7), contact 6 of relay SA1(7), contact 6 of relay SA2(7), contact 5 of relay SA3(7), conductor 323, contact 4 of relay MCA2-(2), conductor 233 to ground through the winding of relay U3(5). With relays SNG2(3) and NGK1(3) reoperated, battery is connected to the armatures of the units relay U3(5) to reset the line location registers 204, 205, 206, 207 and 208. Some one of the ringing control relays, other than relay RCN10(7), will be operated to control the type of ringing current to be supplied to the called line.

If none of the lines in the first group tested is idle, none of the relays SL0(7) to SL9(8) operates and the marker proceeds, after a measured time interval, to advance and test another group of ten lines. Timing is performed by means of relay TYM(4). When the marker is ready to set up a terminating stage, it connects battery to conductor 405 and ground to conductors 406 and 407, completing a circuit from battery on conductor 405 through the lower winding of relay TYM(4), through resistance TYM0(4) and condenser TYMC(4) to ground on conductor 406. Resistance TYM0(4) and condenser TYMC(4) are shunted by ground on conductor 407, over contact 1 of relay AK(4). A second circuit is closed from battery on conductor 405, through the upper winding of relay TYM(4), contact 6 of relay PBX2(4) and through high resistance TYM1(4) to ground on conductor 406. Relay TYM(4) is energized by these circuits in a direction to hold its contact 1 closed.

When relay PBX2(4) operates as above described to indicate that the marker is to test a PBX group, the circuit through the upper winding of relay TYM(4) is transferred from high resistance TYM1(4) to low resistance TYM2(4). With relays PBX2(4), SLCK(4) and SLC(8) operated, to prepare for testing a group of lines, a circuit is closed from off-normal ground over contact 1 of relay TYM(4), contact 1 of relay PBX2(4), contact 1 of relay SLCK(4), contact 3 of relay AK(4), conductor 408, contact 1 of relay SLC(8), conductor 802 to battery through the winding of relay A(4). Relay A(4) operates and locks over its contact 5 and contact 2 of relay SCR(4) to off-normal ground. Relay A(4) also closes a circuit from battery through resistance lamp NGB(4), contact 2 of relay A(4), conductor 409, contact 2 of relay MCC(6), conductor 605, contact 1 of relay SC1(5) to ground through the winding of relay A(5). Relay A(5) operates and closes a circuit from ground over its contact 1, conductor 501, contact 16 of relay MCC(6), conductor 606 to battery through the winding of relay AK(4) as a check that relay A(5) is operated. Relay AK(4) opens the shunt around resistance TYMO(4) and condenser TYMC(4), allowing condenser TYMC(4) to charge in series with the lower winding of relay TYM(4) causing that relay to hold its contact 1 closed for a measured interval.

When the charging current for condenser TYMC(4) ceases, the upper winding of relay TYM(4) becomes effective to close contact 2 of that relay. If, during this interval, none of the relays SL0(7) to SL9(8) has operated, none of the relays SA0(7) to SA9(8) will have been operated. A circuit is therefore closed from off-normal ground over contact 2 of relay TYM(4), retard coil TYMR(4), contact 7 of relay PBX2(4), contact 2 of relay AK(4), contact 4 of relay A(4), winding of group busy relay GB(4), conductor 410, contact 6 of relays SA9(8) to SA0(7), conductor 330, contact 1 of relay TR1A(3), conductor 210, through the units register to conductor 400, contact 4 of relay UT(4) to battery through resistance lamp UBS(4). It may be noted that if the units digit is other than zero, this circuit extends over the contact 6 of the corresponding one of relays SA9(8) to SA0(7), the associated contact of relay TR1A(3) and the operated relays of the units register. Therefore, the units digit determines the first line to be tested in the first group of lines.

The group busy relay GB(4) operates and locks over its contact 6 to battery through resistance lamp UBS(4). Relay GB(4) opens the circuit of relay SLC(8) and that relay releases disconnecting the test relays from the lines associated with the first tens group. Relays GB(4) also closes a circuit from off-normal ground over contact 3 of relay GB(4), contact 2 of relay EG(4) to battery through the winding of relay UT(4). Relay UT(4) operates and locks over its contact 1 to off-normal ground, disconnecting battery from the operating circuit of relay GB(4). Relay GB(4) also opens the holding circuit for the hundreds block relay HBO(1) and that relay releases. Relay GB(4) also releases relay SLCK(4). The release of relay SLCK(4) opens the holding circuit for relays TBO0(1) and SC1(5) and these relays release. The release of relay SC1(5) opens the operating circuit for relay A(5) but relay A(5) is held operated in a circuit from ground through its winding, over its contact 2, conductor 502, contact 15 of relay MCC(6), conductor 607, winding of relay SCR(4), contact 3 of relay SLCK(4), contact 3 of relay PBX2(4) to battery. As soon as the operating circuit of relay A(5) is opened, relay SCR(4) operates, releases relay A(4) and prepares a path for operating another TB(1) relay. Relay A(4) in releasing closes a circuit from battery through resistance lamp NGB(4), contact 1 of relay A(4), contact 2 of relay UT(4), contact 1 of relay SCR(4), conductor 411, contact 13 of relay MCC(6), conductor 608, contact 4 of relay A(5) to ground through the winding of the tens block relay with which the next group of lines is associated, for example, relay TB90(1), and through the winding of its associated relay SC2(5).

The release of relay A(4) also releases relay GB(4), which recloses the circuit of relay SLC(8), reoperating that relay. With relay GB(4) released and relay SC2(5) operated, relay SLCK(4) operates over the operating circuit of relay SC2(5) in a manner previously described and closes a locking circuit for itself and for relays SC2(5) and TB90(1). With relay A(4) released, the hundreds block relay HB9(1), with which relay TB90(1) is associated, is operated in a circuit from ground through its winding, conductor 102, contact 3 of relay A(5), conductor 503, contact 14 of relay MCC(6), conductor 609, contact 3 of relay A(4), contact 2 of relay PBX2(4), conductor 305 to battery through resistance lamp HBS(3). Relay HB9(1) operates and is held operated in a circuit from ground through its winding over its contact 11, conductor 222, contact 21 of relay MCA1(2), conductor 403, contact 1 of relay GB(4), contact 2 of relay PBX2(4), conductor 305 to battery through resistance lamp HBS(3).

When relay SLCK(4) operates, it opens the circuit of relay SCR(4) and the holding circuit for relay A(5) causing these two relays to release and in turn release relay AK(4). Relay AK(4) recloses the shunt around condenser TYMC(4) so that relay TYM(4) recloses its contact 1. With relay AK(4) released and relays SLC(8) and SLCK(4) operated, relay A(4) is operated as before.

Assuming that this group of lines is the last group for the designation registered, as soon as relay A(4) is reoperated, a circuit is closed from battery through resistance lamp NGB(4), contact 2 of relay A(4), conductor 409, contact 2 of relay MCC(6), conductor 605, contact 1 of relay SC2(5), conductor 504, contact 17 of relay MCC(6), conductor 610 to ground through the winding of end-of-group relay EG(4).

The last group of lines is now tested. If this last group contains less than ten lines, the sleeve conductors of any individual lines assigned to this group of numbers will not be connected to the armatures of relay SC2(5) so that the corresponding ones of the test relays SL0(7) to SL9(8) will not be operated, regardless of the condition of the line assigned to the corresponding number. As previously described, the operated sleeve test relays in turn operate corresponding auxiliary relays SA0(7) to SA9(8). If an idle line is found, relay SAE(4) operates to cause the translation to be made as previously described. For any group of lines after the first, relay UT(4) is operated and the circuit for selecting an idle line extends from battery through resistance lamp UBS(4), contact 3 of relay UT(4), conductor 412, contacts 11 and 1 of relay TR1A(3), conductor 330, over back contacts (contacts 6) of unoperated sleeve auxiliary relays and over the front contact (contact 5) of the first operated sleeve auxiliary relay to the winding of the corresponding units relay in the number group circuit.

If all of the lines are busy, the circuit above traced will extend over the back contacts (contacts 6) of all of the sleeve auxiliary relays to the winding of relay GB(4). With relay EG(4) operated, the operation of relay GB(4) closes a circuit from ground over its contact 2 and contact 1 of relay EG(4) to conductor 413 to cause the marker to transmit a line busy signal to the calling line.

From the foregoing description it will be apparent that the standard arrangement does not permit the assignment of more than one number in a group of ten consecutive numbers to P. B. X trunk groups. There are circumstances however under which it is desirable to make such assignment, and, in accordance with the present invention, means has been provided to make such assignment possible.

Assume, for example, that it is desired to use the designation 9990 for one P. B. X group and the designation 9997 for another group, the group of lines identified by the designation 9990 including three lines numbered 9990 to 9992 and the group of lines identified by the designation 9997 including the three lines numbered 9997 to 9999. To make this possible an auxiliary tens relay TBA(5) will be connected in parallel with the regular tens block relay TB99(1).

If, now, a connection is desired with the P. B. X identified by the designation 9990, this number will be registered in the marker in the manner previously described and, assuming that the number group circuit shown is associated with the thousands digit 9, the number group circuit will be seized, the connector relays MCA1(2), MCA2(2), MCB(6) and MCC(6) will be operated, as well as relays HB9(1), TB99(1) and units relay U0(5), in the manner previously described. Relay TBA(5) will be operated in parallel with relay TB99(1). With relay TBA(5) operated, battery over the operating circuit of relay TBA(5) is extended over contact 1 of relay TBA(5)

to contact 5 of the units relays U0(5) to U9(5). Since relay U0(5) has been operated the circuit is extended over contact 5 of relay U0(5) and contact 2 of relay TBA(5), winding of relay SC4(5), right winding of relay XSC(5) to ground. Relay SC4(5) operates in this circuit but relay XSC(5) is marginal and operates only if, due to some false cross-connection or other trouble, more than one relay like relay SC4(5) is operated. It will be noted that the circuit for relay SC4(5) may also be closed over contact 5 of relay U1(5) and contact 3 of relay TBA(5) or over contact 5 of relay U2(5) and contact 4 of relay TBA(5) so that if any one of the numbers included in the PBX group is dialed, the associated sleeve connector relay SC4(5) will be operated.

Translation takes place over contacts 2, 3 and 4 of relay U0(5) and the contacts of relay TB99(1) in the manner previously described, resulting in the operation of ringing control relay RCN10(7) followed by relays RCT10(7), PBX(3) and PBX2(4). With relays PBX(3) and PBX2(4) operated, the operating circuit for relay SC4(5) is extended over contact 2 of relay SC4(5), conductor 604 to ground through the winding of relay SCK(1) and, in parallel therewith, over contact 1 of relay MCC(6), conductor 303, contact 7 of relay PBX(3), conductor 401, contact 4 of relay PBX2(4), winding of relay SLCK(4), contact 4 of relay GB(4) to off-normal ground. Relay SLCK(4) operates and locks over its contact 4 to battery over contact 3 of relay PBX2(4), thereby holding itself operated and providing holding circuits for relays SC4(5) and SCK(1). Relay SCK(1) extends this holding circuit over its contacts 2 and 1 to conductor 103 to provide a holding circuit for relays TBA(5) and TB99(1).

Relay SC4(5) connects the sleeve test conductors of the three lines numbered 9990, 9991 and 9992 to the windings of the test relays SL0(8), SL1(8) and SL2(8). The selection of an idle line takes place as previously described. On the assumption that there are only three lines in the group, relay SC4(5) has been shown as closing the previously traced circuit for relay EG(4). However, if the traffic requires the use of additional lines, relay SC4(5) may operate a relay like relay A(5) in the same manner as does relay SC1(5). Completion of the translation takes place as previously described.

Similarly, if the number 9997 is dialed, relays HB9(1), TB99(1) and U7(5) will be operated, relay TBA(5) being operated in parallel with relay TB99(1). In the manner above described, the operating battery for relay TBA(5) is extended over contact 1 of relay TBA(5), over contact 5 of relay U7(5), contact 9 of relay TBA(5), winding of relay SC3(5) to ground through the right winding of relay XSC(5). Parallel circuits are provided over contacts 5 of relays U8(5) and U9(5) so that, if any one of the designations 9997 to 9999 is dialed, relay SC3(5) will be operated. Relay SC3(5) connects the sleeve conductors of the lines numbered 9997 to 9999 to the windings of test relays SL7(8), SL8(8) and SL9(8). Since only these three test circuits are closed, only these three lines are tested and one will be selected or a busy signal returned. While in the drawing the line numbers assigned to the two PBX groups are consecutive, since the subgroup relays close the testing circuits for only those lines included in the group, the numbers assigned to these lines need not necessarily be consecutive.

Certain possible modifications of the circuit have been indicated by alternate wiring. For example, if it were desired to assign certain lines in the tens group represented by tens block relay TB99(1) to a previously existing PBX group, the advance relay A1(5) would be provided for such previously existing group, and would provide a path for operating the tens block relay TB99(1) and the auxiliary tens block relay TBA(5). In such a case the advance relay A1(5) supplies the circuit for operating the subgroup relay, for example, relay SC4(5).

The multiple connection of the terminals of the tens block auxiliary relay TBA(5) enhances the possibility of accidental cross-connections, which might cause more than one of the subgroup relays to operate following the operation of relay TBA (5). If more than one subgroup relay operates, there is a good chance that a wrong number may be reached, since the marker would test all of the lines associated with all of the operated subgroup relays. Therefore, the windings of the subgroup relays, such as relays SC3(5) and SC4(5), are connected to ground through the right winding of relay XSC(5) as above traced. At the same time that relay TBA(5) connects battery to conductor 103 to close an operating circuit for relay SC3(5) or for relay SC4(5), a branch of conductor 103 is connected through resistance X(5) through the left winding of relay XSC(5) to ground. Relay XSC(5) is differentially wound and the value of resistance X(5) is so chosen that the simultaneous closure of the circuits through the two windings of relay XSC(5) will not cause that relay to open its contact. However, if more than one of the sleeve connector relays SC3(5) and SC4(5) is energized, the energization of the right winding of relay XSC(5) will overbalance the energization of its left winding and the relay will operate. It will be remembered that the battery supply for one of the translations was carried in parallel over back contacts of relay SCK(1) and of relay XSC(5). With relay SCK(1) operated, if relay XSC(5) operates, battery is disconnected from conductor 101, translation cannot take place and the marker times out to cause a trouble record to be made as described in the Busch patent.

What is claimed is:

1. In a telephone system, subscribers' lines having test conductors, certain of said lines having individual numerical designations including a plurality of digits, others of said lines assigned in groups to one designation, switching means for connecting with said lines, each line having an individual location in said switching means, means for controlling the operation of said switching means, means for registering the digits of telephone designations in said control means, translating means for translating a line designation into a line location, said translating means including a set of terminals for each designation, means under the control of said designation registering means to mark one of said sets of terminals, indicating means operated over said marked set of terminals to indicate when said designation is one assigned to a group of lines, line testing relays in said control means, connector relays for connecting said testing relays to the test conductors of a group of lines, means for operating certain of said connector relays in response to the operation of said indicating means in accordance with a plurality of the registered digits of the designation of a group of lines, and means for operating others of said connector relays in response to the operation of said indicating means in accordance with a greater plurality of the registered digits of the designation of a group of lines.

2. In a telephone system, subscribers' lines having test conductors, certain of said lines having individual numerical designations, others of said lines assigned in groups to one designation, said designations including hundreds, tens and units digits, switching means for connecting with said lines, each line having an individual location in said switching means, means for controlling the operation of said switching means, means for registering the digits of telephone designations in said control means, translating means for translating a line designation into a line location, said translating means including a set of terminals for each designation, means under the control of said digit registering means to mark one of said sets of terminals, indicating means operated over said marked set of terminals to indicate when said designation is one assigned to a group of lines, line testing relays in said control means, connector relays for connecting said testing relays to the test conductors of a group of lines, means for operating certain of said connector relays in response to the operation of said indicating means in accordance with the registered hundreds and tens digits of the designation of a group of lines, and means for operating others of said connector relays in response to the operation of said indicating means in accordance with the registered hundreds, tens and units digits of the designation of a group of lines.

3. In a telephone system, subscribers' lines, certain of said lines having individual numerical designations, others of said lines assigned in groups to one designation, said designations including hundreds, tens and units digits, switching means for connecting with said lines, each line having an individual location in said switching means, means for controlling the operation of said switching means, means for registering the digits of telephone designations in said control means, translating means for translating a line designation into a line location, said translating means including a set of terminals for each designation, means under the control of said designation registering means to mark one of said sets of terminals, including tens block relays individual to groups of ten consecutive designations and units relays individual to the units digit of designations, indicating means operated over said marked set of terminals to indicate when said designation is one assigned to a group of lines, line testing means in said control means, connector relays for connecting said testing means to the test conductors of a group of lines, means for operating certain of said connector relays in response to the operation of said indicating means under the control of the operated tens block relay, and means for operating others of said relays in response to the operation of said indicating means under the joint control of the operated tens block relay and the operated units relay.

No references cited.